United States Patent
Park et al.

(10) Patent No.: US 9,303,591 B2
(45) Date of Patent: Apr. 5, 2016

(54) PROPULSION SYSTEM AND ROCKET HAVING THE SAME

(71) Applicants: Byeong Yeol Park, Daejeon (KR); Song Hoe Koo, Daejeon (KR); Ji Chang Yoo, Daejeon (KR); Young Dae Doh, Daejeon (KR)

(72) Inventors: Byeong Yeol Park, Daejeon (KR); Song Hoe Koo, Daejeon (KR); Ji Chang Yoo, Daejeon (KR); Young Dae Doh, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 626 days.

(21) Appl. No.: 13/864,643

(22) Filed: Apr. 17, 2013

(65) Prior Publication Data
US 2014/0102109 A1    Apr. 17, 2014

(30) Foreign Application Priority Data
Oct. 15, 2012    (KR) .................. 10-2012-0114400

(51) Int. Cl.
*B63H 11/00* (2006.01)
*F02K 9/97* (2006.01)
*F02K 9/38* (2006.01)

(52) U.S. Cl.
CPC .. *F02K 9/978* (2013.01); *F02K 9/38* (2013.01)

(58) Field of Classification Search
CPC ............... F02K 9/38; F02K 9/36; F02K 9/32; F02K 3/343; F02K 9/92
See application file for complete search history.

(56) References Cited

U.S. PATENT DOCUMENTS

| | | | |
|---|---|---|---|
| 3,613,374 A * | 10/1971 | Ritchey | 60/219 |
| 5,036,658 A * | 8/1991 | Tate | 60/253 |
| 5,228,285 A * | 7/1993 | Van Name et al. | 60/253 |
| 5,311,820 A * | 5/1994 | Ellingsen | 102/481 |
| 5,394,803 A * | 3/1995 | Mort | 102/377 |
| 5,735,114 A * | 4/1998 | Ellingsen | 60/39.1 |
| 5,936,188 A * | 8/1999 | Atkinson | 102/380 |
| 6,035,631 A * | 3/2000 | Cannon | 60/255 |
| 6,752,085 B2 * | 6/2004 | Roach | 102/481 |
| 2003/0079464 A1* | 5/2003 | Solberg et al. | 60/223 |

FOREIGN PATENT DOCUMENTS

| | | |
|---|---|---|
| JP | 07-091898 A | 4/1995 |
| JP | H 11-508662 A | 7/1997 |
| JP | 11-351058 A | 12/1999 |
| JP | 2003-148249 A | 5/2003 |

* cited by examiner

*Primary Examiner* — Gerald L Sung
(74) *Attorney, Agent, or Firm* — Scully Scott Murphy and Presser

(57) ABSTRACT

Disclosed is a propulsion system and a rocket having the same. The propulsion system includes: a combustion tube having a propellant therein; a nozzle installed at a rear end of the combustion tube, and configured to discharge combustion gas generated when the propellant is ignited; and a nozzle separation unit coupled to the combustion tube and the nozzle, respectively, and configured to mount the nozzle to the combustion tube, and configured to separate the nozzle from the combustion tube as at least part thereof melts when reaching a preset temperature.

17 Claims, 2 Drawing Sheets

PROPULSION SYSTEM AND ROCKET HAVING THE SAME

CROSS-REFERENCE TO RELATED APPLICATION

Pursuant to 35 U.S.C. §119(a), this application claims the benefit of earlier filing date and right of priority to Korean Application No. 10-2012-0114400, filed on Oct. 15, 2012, the contents of which is incorporated by reference herein in its entirety.

BACKGROUND OF THE INVENTION

1. Field of the Invention

The present disclosure relates to a propulsion system capable of separating a nozzle from a combustion tube when heat is transferred thereto from the outside, and a rocket having the same.

2. Background of the Invention

Generally, a propellant for propelling a rocket including missiles is disposed in a combustion tube. Normally, a propulsion force is generated as the propellant is ignited by an igniter, and combustion gas generated by the ignition of the propellant is discharged out through a nozzle. Each propellant has a unique ignition temperature which is generally much higher than a storage temperature of a rocket.

If such propellant is wrongly handled, a very dangerous situation may occur. For instance, if the propellant is abnormally ignited by flames due to an external fire, pressure inside the combustion tube drastically increases to cause explosion of the combustion tube, or the occurrence of an uncontrollable propulsion force, etc. Once the propellant is ignited, stopping the operation of the propellant is impossible. Therefore, explosion of the combustion tube due to the ignited propellant causes severe problems such as loss of life and property, in the vicinity of the rocket.

In order to solve such problems, has been proposed a method for fabricating the combustion tube using organic fibers which melt at a specific temperature (e.g., 150° C.). However, such organic fibers should have a great thickness for application to the combustion tube, due to a low mechanical property thereof. In order to structurally connect the combustion tube and the nozzle with each other, shape memory alloys may be used. However, such shape memory alloys should have a great thickness for connection between the combustion tube and the nozzle, due to a low mechanical property thereof. In this case, a coupling structure between the combustion tube and the nozzle becomes complicated.

In order to solve such problems occurring from an abnormal ignition of the propellant, research is being actively ongoing.

SUMMARY OF THE INVENTION

Therefore, an aspect of the detailed description is to provide a propulsion system capable of separating a nozzle from a combustion tube when heat is transferred thereto from the outside, and a rocket having the same.

To achieve these and other advantages and in accordance with the purpose of this specification, as embodied and broadly described herein, there is provided a propulsion system, comprising: a combustion tube having a propellant therein; a nozzle installed at a rear end of the combustion tube, and configured to discharge combustion gas generated when the propellant is ignited; and a nozzle separation unit coupled to the combustion tube and the nozzle, and configured to mount the nozzle to the combustion tube, and configured to separate the nozzle from the combustion tube as at least part thereof melts when reaching a preset temperature.

According to an embodiment of the present invention, the preset temperature may be set to be higher than a maximum storage temperature of the propulsion system, but to be lower than an ignition temperature of the propellant. For instance, the preset temperature may be within the range of 90-120° C.

According to an embodiment of the present invention, the nozzle separation unit may include a fixing member coupled to the combustion tube, and configured to melt when reaching the preset temperature; a snap ring coupled to the fixing member, and configured to fix the nozzle by being inserted into a mounting groove formed at a rear end of the combustion tube; and an elastic member connected to the nozzle and the snap ring in a tensioned state, respectively, and configured to separate the snap ring from the mounting groove when the fixing member melts.

According to an embodiment of the present invention, a mounting groove stepped towards the inside of the combustion tube so as to mount the end of the nozzle, may be formed at a rear end of the combustion tube. And, the snap ring may be formed to support, in a covering manner, the end of the nozzle mounted in the mounting groove.

According to an embodiment of the present invention, the fixing member may be installed in the combustion tube adjacent to the nozzle, so as to melt by heat transferred from the outside.

According to an embodiment of the present invention, the fixing member may be an alloy of bismuth, tin, lead and cadmium.

According to an embodiment of the present invention, the fixing member may be screw-coupled to the combustion tube.

According to an embodiment of the present invention, the mounting groove may be recessed in a direction crossing a shaft direction of the combustion tube.

According to an embodiment of the present invention, the snap ring may be provided in plurality, and the plurality of snap rings may be disposed on an inner circumferential surface of the combustion tube. The fixing member may be provided in plurality, and the plurality of fixing members may be disposed among the snap rings.

According to an embodiment of the present invention, the elastic member may be implemented as a spring connected to the nozzle and the snap ring in a tensioned state, respectively. Two ends of the spring may be respectively fixed to the nozzle and the snap ring by bolts.

According to an embodiment of the present invention, the elastic member may be in a tensioned state towards the center of the nozzle, such that the snap ring moves towards the center of the nozzle when the fixing member melts.

To achieve these and other advantages and in accordance with the purpose of this specification, as embodied and broadly described herein, there is also provided a rocket, comprising: a propulsion system configured to separate a nozzle from a combustion tube when heat is transferred thereto from the outside; and a control unit mounted to the combustion tube, and configured to control an ignition time point of a propellant.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a propulsion system and a rocket having the same according to the present invention will be explained in more detail with reference to the attached drawings.

A singular expression includes a plural concept unless there is a contextually distinctive difference therebetween.

Figure 1:
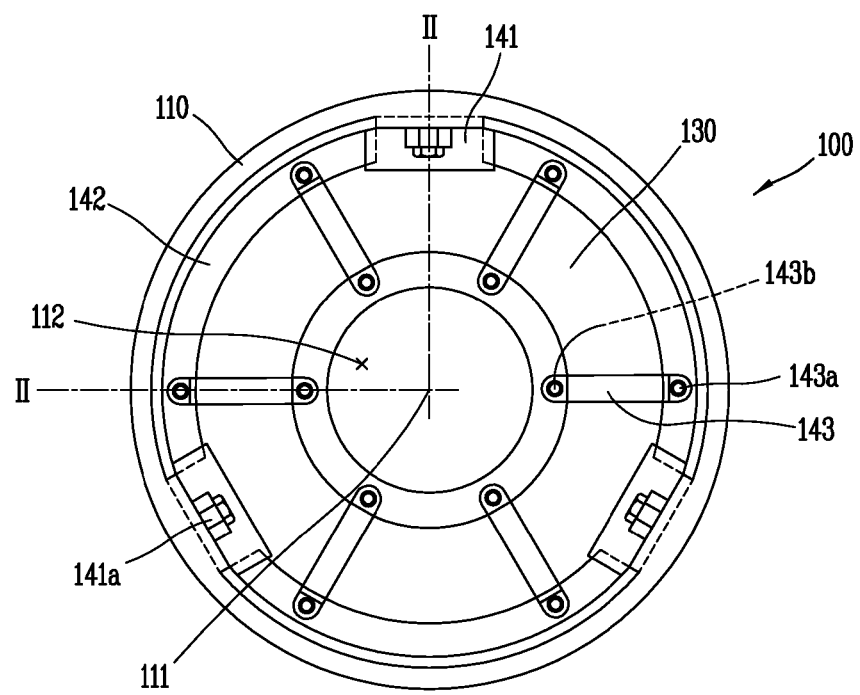
FIG. 1 is a rear view showing a rear end of a propulsion system according to an embodiment of the present invention.
Figure 2:
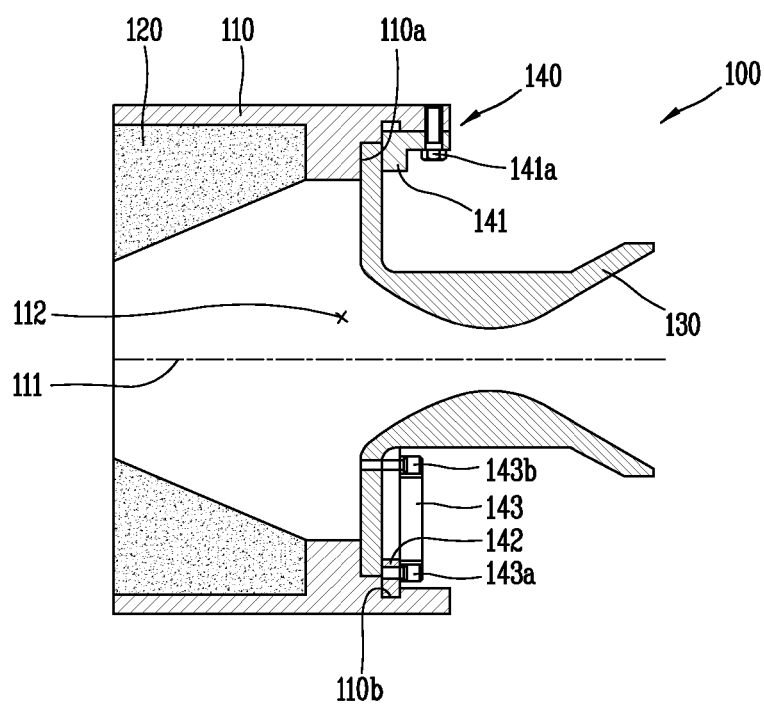
FIG. 2 is a sectional view taken along line 'II-II' in FIG. 1.

FIG. 1 is a rear view showing a rear end of a propulsion system according to an embodiment of the present invention, and FIG. 2 is a sectional view taken along line 'II-II' in FIG. 1.

A rocket according to the present invention may be understood to include a flying object which flies in space, missiles guided until when the flying object reaches a target point, etc. The rocket includes a control unit (not shown) and a propulsion system 100.

The control unit is mounted to a combustion tube 110, and is configured to control an ignition time point of a propellant 120. The control unit may include a guide portion for guiding movement of the rocket using a sensor. For instance, the control unit may include a guidance control section (GCS).

The propulsion system 100 is configured to provide a propulsion force to the rocket, and has a structure that a nozzle 130 is separated from a combustion tube 110 when heat is transferred to the propulsion system 100 from the outside. Referring to FIGS. 1 and 2, the propulsion system 100 according to the present invention comprises a combustion tube 110, a nozzle 130 and a nozzle separation unit 140.

The combustion tube 110 is formed as a hollow cylinder having an inner space. The propellant 120 for generating a thrust (propulsion force) is provided in the combustion tube 110. The propellant 120 may be implemented in the form of a solid. The propellant 120 may be formed in plurality in number, and the plurality of propellants 120 may be configured to have different internal ballistic characteristics through a grain design.

An opening 112 is formed at the rear end of the combustion tube 110, and the nozzle 130 through which combustion gas is discharged is mounted to the opening 112. In this embodiment, the nozzle 130 is installed at a mounting groove 110a formed at an inner side of the rear end of the combustion tube 110.

The nozzle separation unit 140 is coupled to the combustion tube 110 and the nozzle 130, and is configured to mount the nozzle 130 to the combustion tube 110. The nozzle separation unit 140 is configured to separate the nozzle 130 from the combustion tube 110 as at least part thereof melts when reaching a preset temperature.

Preferably, the preset temperature is set to be higher than a maximum storage temperature of the propulsion system 100, but to be lower than an ignition temperature of the propellant 120. For instance, the preset temperature may be within the range of 90-120° C.

In order to solve a problem occurring as the propellant 120 is abnormally ignited due to heat transfer from the outside, the propulsion system 100 of the present invention provides a new structure that the nozzle 130 is separated from the combustion tube 110 when heat is transferred to the propulsion system 100 from the outside. Hereinafter, such structure will be explained in more detail.

The nozzle separation unit 140 includes a fixing member 141, a snap ring 142 and an elastic member 143.

The fixing member 141 is coupled to the combustion tube 110. In the drawings, a female screw is formed in the combustion tube 110, and the fixing member 141 is fixed to the combustion tube 110 by a bolt 141a. The female screw may be recessed in a thickness direction of the combustion tube 110, so that the bolt 141a coupled to the female screw can endure against a propulsion force applied in the side direction.

The fixing member 141 is formed to melt when reaching a preset temperature. For instance, the fixing member 141 may be an alloy of bismuth, tin, lead and cadmium. Preferably, the preset temperature where the fixing member 141 melts, is set to be higher than a maximum storage temperature of the propulsion system 100, but to be lower than an ignition temperature of the propellant 120. For instance, the preset temperature may be within the range of 90~120° C.

The fixing member 141 is disposed at a position exposed to the outside, so as to melt by heat transferred from the outside. As shown, the fixing member 141 may be installed in the combustion tube 110 adjacent to the nozzle 130.

The snap ring 142 is coupled to the fixing member 141, and is configured to fix the nozzle 130 by being inserted into a mounting groove 110b formed at the rear end of the combustion tube 110. More specifically, the end of the nozzle 130 is mounted to the mounting groove 110a, and the snap ring 142 is formed to support, in a covering manner, the end of the nozzle 130 mounted in the mounting groove 110a. The mounting groove 110b may be recessed in a direction crossing a direction of a shaft 111 of the combustion tube 110 (i.e., in a thickness direction of the combustion tube 110), so as to effectively support the nozzle 130 against a propulsion force.

The snap ring 142 may be provided in plurality, and the plurality of snap rings 142 may be disposed on an inner circumferential surface of the combustion tube 110. The fixing member 141 may be also provided in plurality, and the plurality of fixing members 141 may be disposed among the snap rings 142. Referring to FIG. 2, the fixing members 141 are arranged to have constant angles therebetween (three fixing members 141 having 120° therebetween), and the snap rings 142 disposed among the fixing members 141 are integrally installed at the combustion tube 110.

The elastic member 143 is connected to the nozzle 130 and the snap ring 142 in a tensioned state, respectively. And, the elastic member 143 is configured to separate the snap ring 142 from the mounting groove 110b by an elastic restoration force when the fixing member 141 melts. As shown in FIG. 2, the elastic member 143 may be implemented as a spring connected to the nozzle 130 and the snap ring 142 in a tensioned state, respectively. Two ends of the spring may be fixed to the nozzle 130 and the snap ring 142 by bolts 143a and 143b. For convenience of installation, a hook structure may be provided at two ends of the spring which is to be connected to the nozzle 130 and the snap ring 142.

The elastic member 143 may be in a tensioned state towards the center of the nozzle 130, so that the snap ring 142 can move towards the center of the nozzle 130 (i.e., move towards the shaft 111 of the combustion tube in the drawings) when the fixing member 141 melts. Referring to FIG. 2, the elastic member 143 is in a tensioned state, so that one end thereof can be fixed to the snap ring 142 which covers the end of the nozzle 130, and another end thereof can be fixed to a position spaced from the end of the nozzle 130 towards the center. The elastic member 143 may be provided in plurality at a single snap ring 142.

Figure 3:
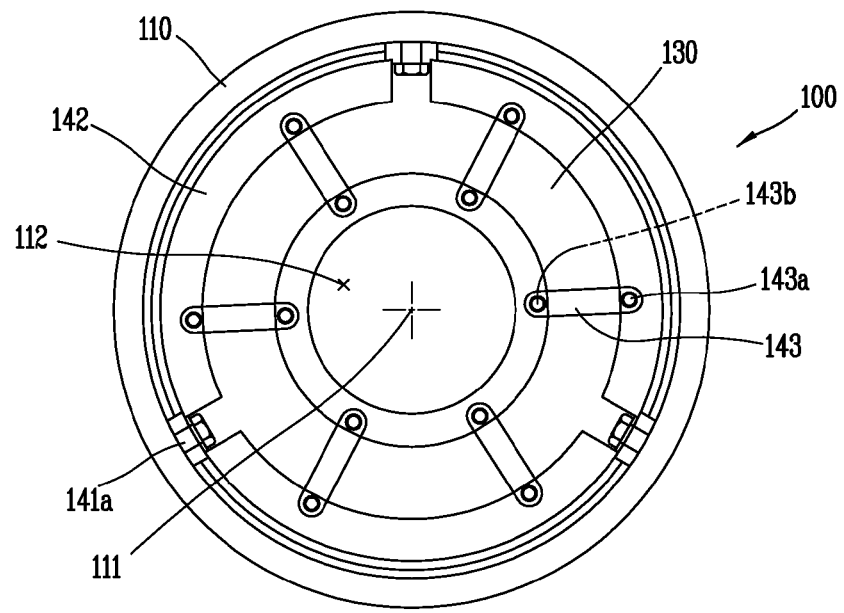
FIG. 3 is a conceptual view showing a state that a snap ring is separated from a mounting groove as a fixing member of FIG. 1 melts.
Figure 4:
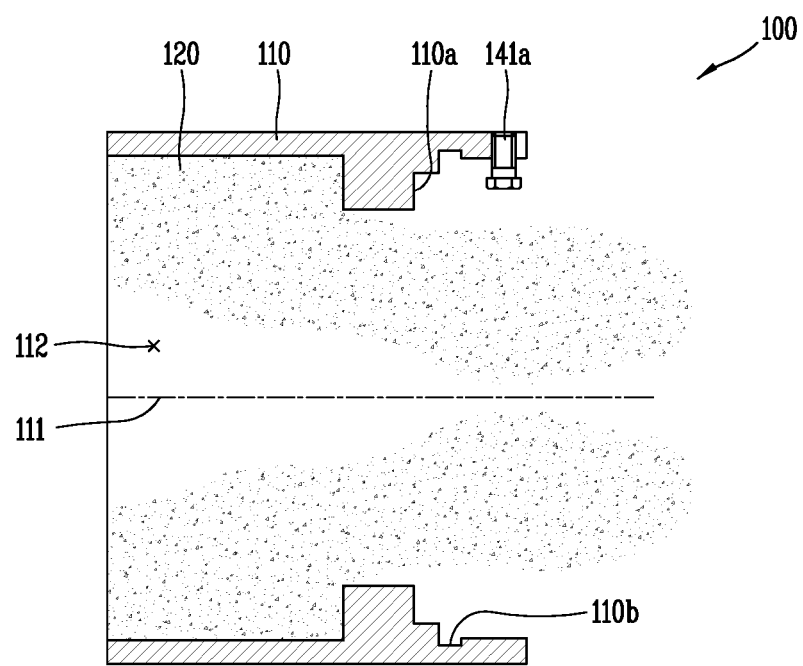
FIG. 4 is a conceptual view showing that combustion gas generated by ignition of a propellant is discharged to an opening of a combustion tube, as a nozzle of FIG. 2 is separated from the combustion tube.

FIG. 3 is a conceptual view showing a state that the snap ring 142 is separated from the mounting groove 110b as the fixing member 141 of FIG. 1 melts, and FIG. 4 is a conceptual view showing that combustion gas generated by ignition of the propellant 120 is discharged to the opening 112 of the combustion tube 110, as the nozzle 130 of FIG. 2 is separated from the combustion tube 110.

Referring to FIGS. 3 and 4, if heat is transferred to the propulsion system 100 from the outside due to an external fire, etc., the temperature of the propulsion system 100 increases. If the temperature of the propulsion system 100 reaches a preset temperature where the fixing member 141 melts, by exceeding a maximum storage temperature of the propulsion system 100, the fixing member 141 has a phase change into a liquid state. Since the preset temperature is lower than an ignition temperature of the propellant 120, the propellant 120 does not start to ignite yet at the preset temperature.

Once the fixing member 141 coupled to the snap ring 142 melts to disappear, the snap ring 142 is separated from the mounting groove 110b by an elastic restoration force of the elastic member 143. Since the snap ring 142 which has fixed the nozzle 130 by being inserted into the mounting groove 110b is separated from the mounting groove 110b, mechanical coupling between the combustion tube 110 and the nozzle 130 is released.

If the propellant 120 reaches the ignition temperature as the temperature of the propulsion system 100 increases, an inner pressure of the combustion tube 110 increases while the propellant 120 is combusted. Since the snap ring 142 which supports the end of the nozzle 130 in a covering manner is in a separated state from the mounting groove 110b, the nozzle 130 is easily separated from the combustion tube 110 even if an inner pressure of the combustion tube 110 increases a little.

Since combustion gas generated when the propellant 120 is ignited is discharged to the opening 112 of the combustion tube 110 having a larger sectional area than the nozzle 130, the inner pressure of the combustion tube 110 scarcely increases. As a result, the combustion tube 110 does not explode. If the temperature of the combustion tube 110 more increases by flames of the propellant 120, the combustion tube 110 collapses.

In the present invention, if the fixing member 141 coupled to the combustion tube 110 melts by reaching a preset temperature, the snap ring 142 which has fixed the nozzle 130 to the combustion tube 110 by being inserted into the mounting groove 110b of the combustion tube 110 is separated from the mounting groove 110b. This may allow the nozzle 130 to be separated from the combustion tube 110, in a case where the propellant 120 is abnormally ignited.

Under such configuration, even if the propellant 120 is abnormally ignited due to fire occurring from the periphery of the combustion tube 110, can be prevented drastic pressure increase in the combustion tube 110 and explosion of the combustion tube 110, as the nozzle 130 is separated from the combustion tube 110.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A propulsion system, comprising:
    a combustion tube having a propellant therein;
    a nozzle installed at a rear end of the combustion tube, and configured to discharge combustion gas generated when the propellant is ignited; and
    a nozzle separation unit coupled to the combustion tube and the nozzle, respectively, and configured to mount the nozzle to the combustion tube, and configured to separate the nozzle from the combustion tube as at least part thereof melts when reaching a preset temperature,
    wherein the nozzle separation unit comprises:
        at least one fixing member coupled to the combustion tube and configured to melt when reaching the preset temperature;
        at least one snap ring coupled to the fixing member and configured to fix the nozzle by being inserted into a mounting groove formed at a rear end of the combustion tube; and
        an elastic member connected to the nozzle and the snap ring in a tensioned state and being configured to separate the snap ring from the mounting groove when the fixing member melts,
    wherein a mounting groove is formed at a rear end of the combustion tube, the mounting groove being stepped towards the combustion tube to mount the end of the nozzle, and
    wherein the snap ring is formed to support, in a covering manner, an end of the nozzle mounted in the mounting groove.

2. The propulsion system of claim 1, wherein the preset temperature is set to be higher than a predetermined maximum storage temperature of the propulsion system and lower than an ignition temperature of the propellant.

3. The propulsion system of claim 2, wherein the preset temperature is within a range of 90~120° C.

4. The propulsion system of claim 1, wherein the fixing member is installed in the combustion tube adjacent to the nozzle, such that the fixing member can be melted by heat transferred from the outside.

5. The propulsion system of claim 1, wherein the fixing member is an alloy of bismuth, tin, lead and cadmium.

6. The propulsion system of claim 1, wherein the fixing member is screw-coupled to the combustion tube.

7. The propulsion system of claim 1, wherein the mounting groove is recessed in a direction crossing a shaft direction of the combustion tube.

8. The propulsion system of claim 1,
wherein the at least one snap ring comprises a plurality of snap rings, and the plurality of snap rings are disposed on an inner circumferential surface of the combustion tube, and
wherein the at least one fixing member comprises a plurality of fixing members, and the plurality of fixing members are disposed among the snap rings.

9. The propulsion system of claim 1, wherein the elastic member comprises a spring connected to the nozzle and the snap ring in a tensioned state, respectively.

10. The propulsion system of claim 9, wherein two ends of the spring are respectively fixed to the nozzle and the snap ring by bolts.

11. The propulsion system of claim 1, wherein the elastic member is in a tensioned state towards the center of the nozzle, such that the snap ring moves towards the center of the nozzle when the fixing member melts.

12. A rocket, comprising:
a combustion tube having a propellant therein;
a nozzle installed at a rear end of the combustion tube, and configured to discharge combustion gas generated when the propellant is ignited;
a nozzle separation unit coupled to the combustion tube and the nozzle, respectively, and configured to mount the nozzle to the combustion tube, and to separate the nozzle from the combustion tube as at least part thereof melts when reaching a preset temperature; and
a control unit mounted to the combustion tube, and configured to control an ignition time point of the propellant,
wherein the nozzle separation unit comprises:
at least one fixing member coupled to the combustion tube and configured to melt when reaching the preset temperature;
at least one snap ring coupled to the fixing member and configured to fix the nozzle by being inserted into a mounting groove formed at a rear end of the combustion tube; and
an elastic member connected to the nozzle and the snap ring in a tensioned state and being configured to separate the snap ring from the mounting groove when the fixing member melts,
wherein a mounting groove is formed at a rear end of the combustion tube, the mounting groove being stepped towards the combustion tube so as to mount the end of the nozzle, and
wherein the snap ring is formed to support, in a covering manner, an end of the nozzle mounted in the mounting groove.

13. The rocket of claim 12, wherein the fixing member is installed in the combustion tube adjacent to the nozzle, such that the fixing member can be melted by heat transferred from the outside.

14. The rocket of claim 12,
wherein the at least one snap ring comprises a plurality of snap rings, and the plurality of snap rings are disposed on an inner circumferential surface of the combustion tube, and
wherein the at least one fixing member comprises a plurality of fixing members, and the plurality of fixing members are disposed among the snap rings.

15. The rocket of claim 12, wherein the elastic member comprises a spring connected to the nozzle and the snap ring in a tensioned state, respectively.

16. The rocket of claim 12, wherein the elastic member is in a tensioned state towards the center of the nozzle, such that the snap ring moves towards the center of the nozzle when the fixing member melts.

17. A propulsion system, comprising:
a combustion tube having a propellant therein;
a nozzle installed at a rear end of the combustion tube, and configured to discharge combustion gas generated when the propellant is ignited; and
a nozzle separation unit coupled to the combustion tube and the nozzle and configured to mount the nozzle to the combustion tube, and configured to separate the nozzle from the combustion tube as at least part thereof melts when reaching a preset temperature,
wherein the nozzle separation unit comprises:
at least one fixing member coupled to the combustion tube and configured to melt when reaching the preset temperature;
at least one snap ring coupled to the fixing member and configured to fix the nozzle by being inserted into a mounting groove formed at a rear end of the combustion tube; and
an elastic member connected to the nozzle and the snap ring in a tensioned state and being configured to separate the snap ring from the mounting groove when the fixing member melts,
wherein the elastic member comprises a spring connected to the nozzle and the snap ring in a tensioned state, and
wherein two ends of the spring are fixed to the nozzle and the snap ring by bolts.

* * * * *